United States Patent [19]

Horiuchi et al.

[11] 4,441,144
[45] Apr. 3, 1984

[54] AUXILIARY HEAD LAMP DEVICE FOR CAR EQUIPPED WITH COVER

[75] Inventors: Tatsuo Horiuchi; Kazushige Kiyota, both of Tatebayashi, Japan

[73] Assignee: Ushio Denki Kabushiki Kaisha, Tokyo, Japan

[21] Appl. No.: 363,515

[22] Filed: Mar. 30, 1982

[30] Foreign Application Priority Data

Apr. 17, 1981 [JP] Japan .................................. 56-57018

[51] Int. Cl.³ ............................................ F21V 17/00
[52] U.S. Cl. .................... 362/375; 362/64;
362/80; 362/82; 362/83; 362/280; 362/295;
362/319; 362/321; 362/359; 362/362; 362/374;
362/376; 280/762
[58] Field of Search ........................ 362/64, 80, 82, 83,
362/280, 295, 319, 321, 359, 362, 374, 375, 376;
280/762

[56] References Cited

U.S. PATENT DOCUMENTS 2,524,442 10/1950 Healey ................................. 362/64
3,544,786 12/1970 Baker ................................... 362/64
3,601,594 8/1971 Carbary ............................... 362/64

Primary Examiner—Stephen J. Lechert, Jr.
Attorney, Agent, or Firm—Ziems, Walter & Shannon

[57] ABSTRACT

This invention discloses an auxiliary head lamp device for a car equipped with a cover, which head lamp is optionally fitted to a car, is lit when driving in fog and is equipped with a cover that can be opened by remote switching operation. The cover of this head lamp device is opened when a solenoid of a cover driving mechanism is energized by operating a switch disposed inside the room of the car. The solenoid may have a function of releasing the cover from a stopper which restricts the cover from moving in its opening direction. The switch may be used also as a switch for the bulb of the auxiliary head lamp. An electric circuit including two thermostat switches for preventing over-heat of the solenoid is preferably employed. The solenoid may be in deenergized state while keeping the bulb lit. A device equipped with a rotary solenoid for directly opening and closing the cover is also disclosed.

7 Claims, 11 Drawing Figures

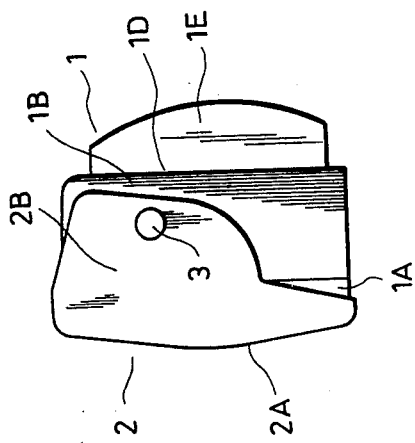
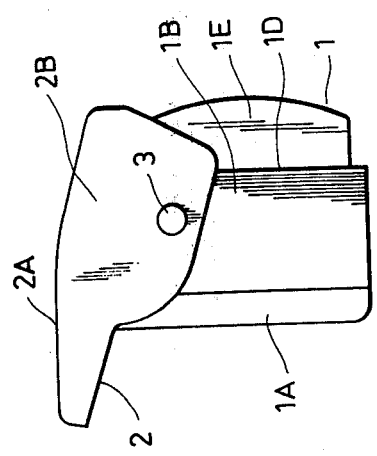

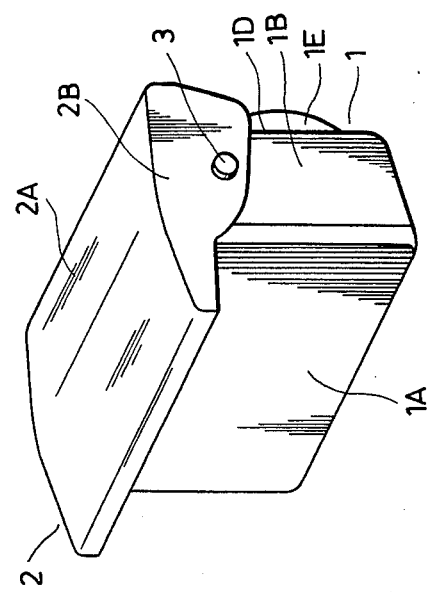

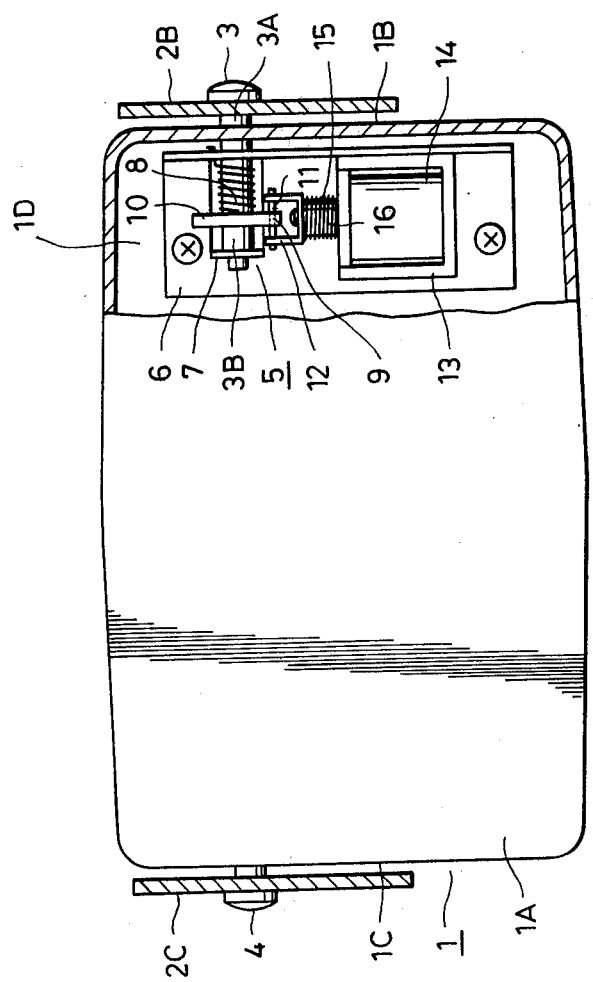

AUXILIARY HEAD LAMP DEVICE FOR CAR EQUIPPED WITH COVER

CROSS REFERENCE TO RELATED APPLICATION

The subject matter of this application is related to that disclosed in U.S. patent application Ser. No. 06/363,514, filed on even date herewith by the present inventors and in common assignment herewith.

BACKGROUND OF THE INVENTION

1. Field of the Invention

This invention relates to an auxiliary head lamp device for a car equipped with a cover and more in particular, to an auxiliary head lamp device for a car equipped with a cover which cover can be opened when a switch is operated.

2. Description of the Prior Art

An auxiliary head lamp for a car is optionally fitted to a car and is lit in accordance with the driving condition such as in driving in fog or rain or in driving in mountains or the like where ambient illumination is not available. The auxiliary head lamp is directed to improve illumination colors and pattern of the main head lamp fitted to the car and to obtain forward illumination for safer driving. A cover for covering the lens of the lamp is often fitted to the auxiliary head lamp lest the lens is broken by a projected or flying pebble or the like when the lamp is not used or is turned off.

In recent years, the auxiliary head lamp has been widely used with or without the cover not only for illumination for safer driving but also for decoration or stressing the personality of a driver.

In the auxiliary head lamp equipped with the cover, the cover must be removed or must be moved from the position where it covers the lens to the position where it opens the lens, whenever the auxiliary head lamp is necessary, and this operation must be manually done. Since this operation is not possible during driving, the car must be once stopped to open the cover. After all, it is extremely troublesome and inconvenient to remove the cover, especially when it is raining or snowing.

SUMMARY OF THE INVENTION

With the background described above, the present invention is directed to provide a convenient auxiliary head lamp device for a car equipped with a cover in which the cover can be moved from the position where it covers the lens to the position where it opens the lens, by operating a switch.

It is another object of the present invention to provide an auxiliary head lamp device for a car equipped with a cover which is capable of reliably opening the cover by means of the operation of a solenoid actuated by the switch operation and which has less trouble but has extended service life.

It is still another object of the present invention to provide an auxiliary head lamp device for a car equipped with a cover which is capable of reliably opening the cover by means of the operation of a solenoid energized by the switch operation and whose solenoid is devoid of the problem of overheat or burn-out.

It is a further object of the present invention to provide an auxiliary head lamp device for a car equipped with a cover which is capable of opening and closing the cover by means of the operation of a rotary solenoid by the switch operation.

BRIEF DESCRIPTION OF THE DRAWINGS

FIGS. 1 through 3 show an auxiliary head lamp device for a car equipped with a cover in accordance with an embodiment of the present invention, in which:

FIG. 1 is a side view when the cover is closed;

FIG. 2 is a side view when the cover is opened; and

FIG. 3 is a perspective view when the cover is opened.

FIGS. 4 and 5 show a cover driving mechanism of the first embodiment, in which:

FIG. 4 is a partially cut-away sectional front view; and

FIG. 5 is an enlarged perspective view of the principal portions.

FIGS. 6 and 7 show the cover driving mechanism, in which:

FIG. 6 shows the state when the cover is closed; and

FIG. 7 shows the state when the cover is opened.

DESCRIPTION OF THE PREFERRED EMBODIMENTS

Figure 5:
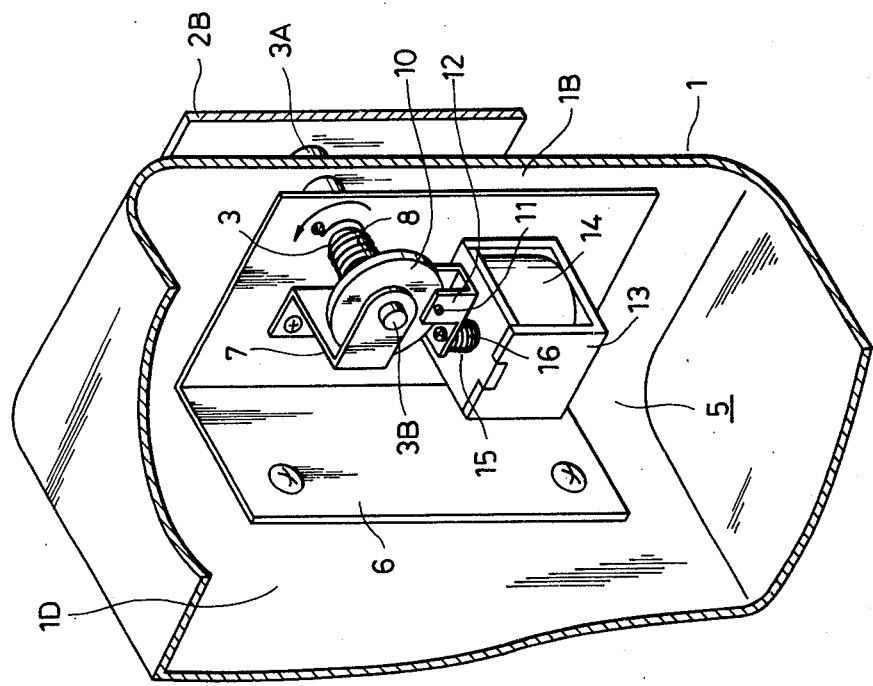

The first embodiment of the present invention is illustrated in FIGS. 1 through 5. In this embodiment, reference numeral 1 represents an auxiliary head lamp for a car (hereinafter referred to as the "auxiliary lamp"). This auxiliary lamp 1 comprises a housing or casing including a lens 1A and a bulb such as a halogen lamp disposed inside the casing. A reflecting mirror is generally disposed inside the casing, or the inner surface of the casing is finished in a mirror surface. A cover 2 consists of a cover portion 2A having a size sufficient to cover the lens 1A and right and left side plates 2B and 2C that project from both side edges of the cover portion 2A and are positioned on the right and left side walls 1B and 1C of the auxiliary lamp 1, respectively. The cover 2 is fixed to the auxiliary lamp 1 by a rotary shaft 3 in cooperation with a connecting shaft 4. The rotary shaft 3 is fitted in such a fashion that its outer end portion 3A is fixed to the right side plate 2B of the cover 1 while its inner portion 3B inwardly protrudes past through the right side wall 1B of the auxiliary lamp 1. The connecting shaft 4 connects turnably the left side plate 2C of the cover 2 to the left side wall 1C of the auxiliary lamp 1 and consists of a screw or the like that is positioned on the extension of the rotary shaft 3. A cover driving mechanism 5 is disposed inside the casing of the auxiliary lamp 1.

The cover driving mechanism 5 has the following construction. A cover driving mechanism support 6 consisting of an L-shaped plate, for example, is fixed to the inner surface of the back wall 1D of the auxiliary lamp 1 close to the right side wall 1B of the auxiliary lamp 1 so that the inner portion 3B of the rotary shaft 3 inside the casing of the auxiliary lamp 1 penetrates through the support 6, rotatably. One end of a rotary shaft support 7 is fixed on this cover driving mechanism support 6 while its other end turnably supports the end of the inner portion 3B of the rotary shaft 3. An elastic member consisting of a spring 8 for urging to rotate the rotary shaft 3 is fitted to the inner portion 3B so that the rotary shaft 3 is urged to rotate from a position at which the cover 2 covers the lens 1A of the auxiliary lamp 1 (hereinafter referred to the "close position") towards a position at which the cover 2 opens the lens 1A (hereinafter referred to as the "open position") in the direction indicated by an arrow in FIG. 5. An operation member is concentrically fixed to the inner portion 3B of the rotary shaft 3. The operation member consists of a disc-like rotary plate or rotary disc 10, for example, having an engaging groove 9 formed at its circumference.

Figure 6:
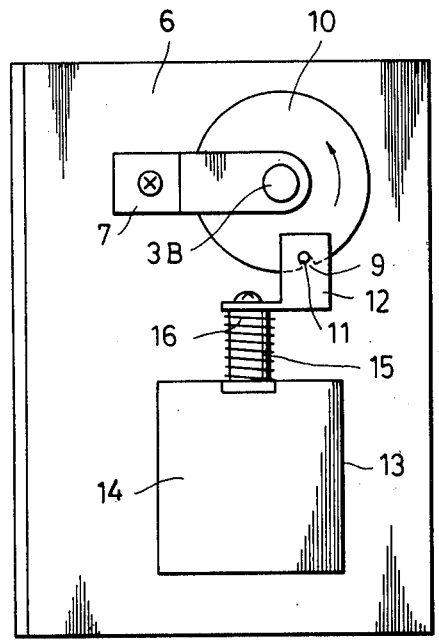
Figure 7:
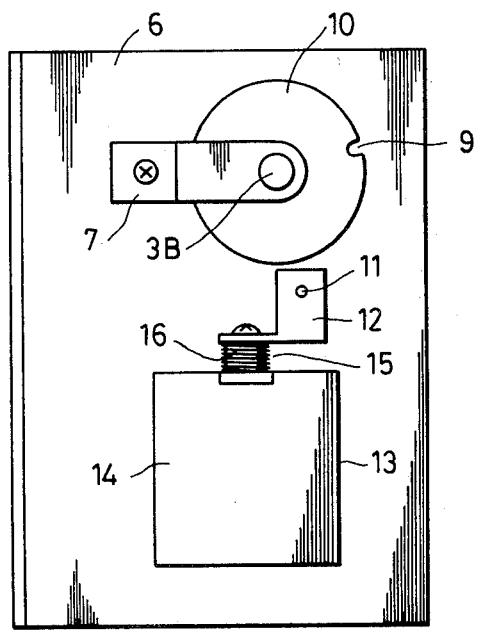

A stopper consisting of an engaging member 11 such as a pin having a shape to mate with the engaging groove 9 of the rotary disc 10 is fixed to an engaging member support 12 disposed at the tip of a plunger 15 of a solenoid 14 which is fixed to the cover driving mechanism support 6 via a solenoid support 13, for example, and forms an operation start driving means. A return spring 16 is fitted to the plunger 15 so that the spring force acts upon the plunger in its projecting direction. The engaging groove 9 of the rotary disc 10 and the engaging member 11 are arranged such that the engaging member 11 is capable of engaging with the engaging groove 9 when the cover 2 is at the close position. The pin of the engaging member 11 and the engaging groove 9 of the disc 10, when mutually engaged, act as a detent to hold the cover 2 in its closed position against the urging of the spring 8. Moreover, the plunger 15 projects as shown in FIG. 6, and disengages from the engaging groove 9 when the plunger 15 is attracted into the solenoid 14 as shown in FIG. 7.

Figure 8:
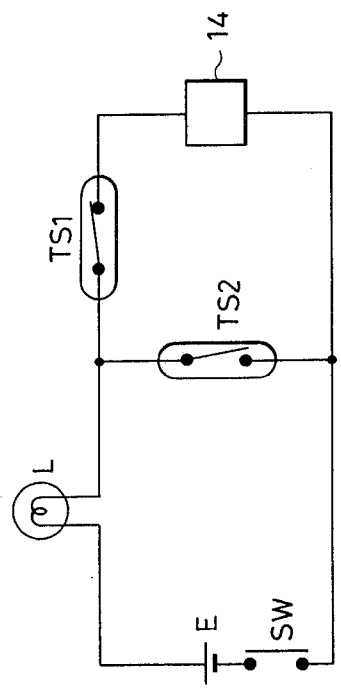
FIG. 8 is a circuit diagram of an example of a preferred electric circuit having a solenoid protective function.
Figure 9:
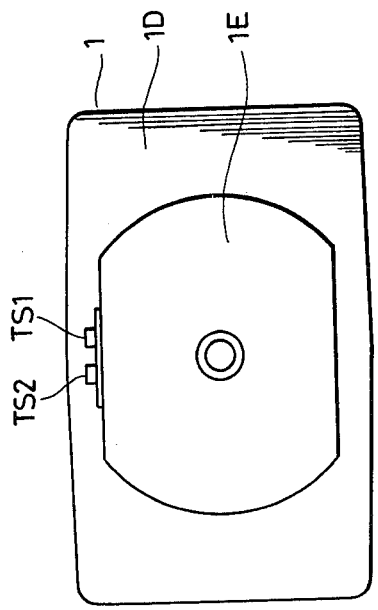
FIGS. 9 and 10 are rear views of the device of the present invention, each showing the positions of thermostat switches.
Figure 10:
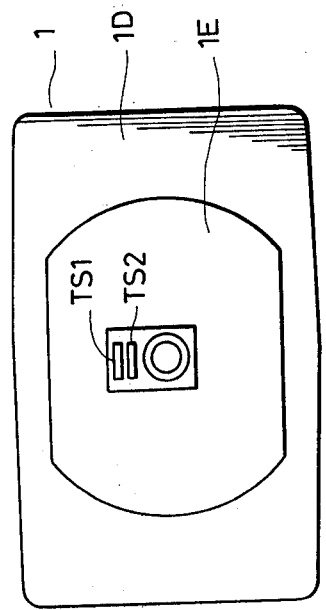

FIG. 8 shows an example of the electric circuit for energizing the solenoid 14. In this circuit the bulb L of the auxiliary lamp is connected to the power source E for the auxiliary lamp such as a car battery and a first thermostat switch TS1 is interposed in series between the bulb L and the solenoid 14. A second thermostat switch TS2 is connected in parallel to the series circuit of the switch TS1 and the solenoid 14. Symbol SW represents a power switch which also serves as a switch for the bulb L and is disposed in the vicinity of the driver's seat of the car, for example. As shown in FIG. 9, for example, both thermostat switches TS1 and TS2 are disposed at the upper part of the outer surface of a concave reflecting portion 1E of the reflector or the casing. Alternatively, the thermostat switches are disposed at the center of the outer surface, as shown in FIG. 10. The first thermostat switch TS1 is kept closed when the temperature of the reflecting portion 1E is below a predetermined first set temperature and opens when it becomes higher than the first set temperature. The second thermostat switch TS2 is open when the temperature of the reflecting portion 1E is below a predetermined second set temperature which is lower than the first set temperature and is closed when the temperature of the reflecting portion 1E is higher than the second set temperature.

In this embodiment, when the auxiliary lamp is not used or when the bulb is turned off, as the switch SW is turned off and no current is supplied to the solenoid 14, the cover 2 may be kept at the close position, because the plunger 15 of the solenoid 14 projects due to the resiliency of the return spring 16, the engaging member 11 engages with the engaging groove 9 of the rotary disc 10 and rotation of the rotary shaft 3 is thus restricted.

In such a state, when the power switch SW is turned on, the solenoid 14 is energized as the first thermostat switch TS1 is being closed, so that the plunger 15 is attracted into the solenoid 14 and the engaging member 11 disengages from the engaging groove 9. Consequently, the rotary shaft 3 is rotated by the resiliency of the spring 8 for rotation and the cover 2 fixed to the rotary shaft 3 moves from the close position to the open position. Simultaneously with this opening operation of the cover 2, the bulb L of the auxiliary lamp is lit as the power switch SW is turned on. When the bulb L is lit, the temperature of the reflecting portion 1E of the auxiliary lamp 1 rises. When this temperature first reaches the second set temperature, the second thermostat switch TS2 that has so far been open is closed. As the temperature of the reflecting portion 1E further rises thereafter and reaches the first set temperature, the first thermostat switch TS1 is opened so that the feed of current to the solenoid 14 is stopped. Since the second thermostat switch TS2 is kept closed, however, the current is continuously supplied to the bulb L without stop and lighting thereof can be continuously maintained.

Due to the operation described above in this embodiment, the cover 2 can be reliably held at the close position for covering the lens 1A by means of the engaging member 11 in cooperation with the engaging groove 9 when the bulb L is not lit. At the lighting of the auxiliary lamp, the cover 2 can be moved to the open position for opening the lens 1A from the close position simultaneously with lighting of the bulb L by the operation of the power switch SW which is disposed inside the room of the car. These procedures can be easily carried out without stopping the car and this arrangement is extremely convenient, especially when it is raining or snowing. When the temperature of the reflecting portion 1E reaches the first set temperature after the cover 2 has moved to the open position, the first thermostat switch TS1 is opened and the feed of current to the solenoid 14 is stopped. Hence, over-heat or burn-out of the solenoid 14 due to the continuous feeding of the current can be prevented and the power consumption can be reduced. At the second set temperature at which the thermostat switch TS1 is not yet opened, the second thermostat switch TS2 is closed so that the feed of current to the solenoid 14 can be stopped while the bulb L is kept lit.

In this embodiment, the first and second thermostat switches TS1 and TS2 may be disposed at positions other than the reflecting portion 1E where the temperature rises when the bulb is lit. Furthermore, these thermostat switches may be disposed at different positions or at those positions where the rates of temperature rise due to lighting of the bulb are different from each other. In such a case, the operating temperatures of both thermostat switches TS1 and TS2 are set so that they operate in the same sequence as described above.

Since the solenoid 14 is compact in size, the cover driving mechanism 5 including the solenoid 14 can be easily disposed inside the casing of the auxiliary lamp 1 and according to this arrangement, almost all portions of the moving parts necessary for opening the cover can be protected from adverse influences from outside. Hence, trouble becomes less and reliable service life can be extended.

In the abovementioned construction in which the cover 2 is urged in the opening direction by the spring 8 for rotation and the engaging member 11 for checking the opening is released to open the cover 2 when the solenoid 14 is energized, the construction becomes simplified and the cover can be rapidly and reliably opened.

Figure 11:
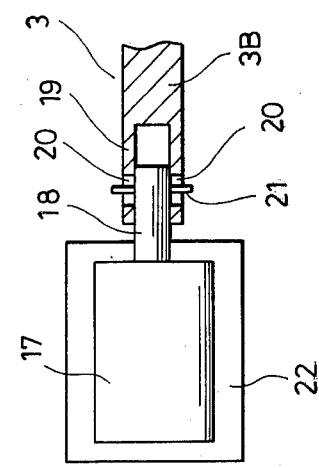
FIG. 11 is a schematic sectional view showing the principal portions of the second embodiment of the present invention.

FIG. 11 shows another embodiment of the present invention. In this embodiment a rotary solenoid 17 is fixed to the cover driving mechanism support 6 by a rotary solenoid support 22 and a shaft 18 of this rotary solenoid 17 is inserted into a cylindrical portion 19 formed at the end of the inner portion 3B of the rotary shaft 3 so as to be capable of sliding in the axial direction. Notches 20, 20 are defined at the cylindrical portion 19 so as to extend in the axial direction and a pin 21 is fixed to the tip of the shaft 18 so as to penetrate through the shaft 18 in its radial direction. Both projecting ends of this pin 21 are inserted into the notches 20, 20 slidably in the axial direction, thereby connecting the shaft 18 to the rotary shaft 3. As an electric circuit for operating the rotary solenoid 17, a series circuit consisting of the power switch SW and the rotary solenoid 17 is interposed between the auxiliary lamp power source E and the bulb L, by way of example.

According to this arrangement, rotation of the shaft 18 of the rotary solenoid 17 can be directly used for rotating the rotary shaft 3. When a current is applied to the rotary solenoid, the shaft 18 rotates by a predetermined angle while undergoing slight displacement in the axial direction due to the electromagnetic action of its internal coil. When the current is cut off, the shaft 18 returns to its original position due to the spring force of the return spring (not shown) fitted to the shaft 18. In this embodiment, the shaft 18 of the rotary solenoid 17 is connected to the rotary shaft 3 by engagement between the notches 20, 20 and the pin 21 and the displacement of the shaft 18 in the axial direction in absorbed by the sliding motion of the pin 21 along the notches 20, 20. After all, only the rotation of the shaft 18 is transmitted to the rotary shaft 3. Accordingly, when the power switch SW is turned on and off, the cover 2 can be moved from the close position to the open position and from the open position to the close position, respectively, by setting the connecting position of the shaft 18 and the rotary shaft 3 in such a manner that the cover 2 is at the close position when the current is not applied to the rotary solenoid 17 and is at the open position when the current is applied to the solenoid. In addition to that, the cover 2 is conveniently moved to the open position simultaneously with turn-on of the bulb and is conveniently moved to the close position simultaneously with turn-off of the bulb.

A commercially available one can be used as the rotary solenoid 17. A rotary solenoid whose shaft 18 has the same angle of rotation as the angle of rotation of the cover 2 from its close position to the open position may be selected.

Though the present invention has been described with reference to the preferred embodiments thereof, they are merely illustrative but in no way limitative. For example, the electric circuit for energizing the solenoid 14 or the rotary solenoid 17 may have an exclusive cover switch independent of the lighting circuit of the bulb. In such a case, the switch for the bulb can be interlocked with the cover switch.

To prevent damage of the solenoid 14 or the rotary solenoid 17 due to over-heat, it is also effective to dispose a protective switch which is opened at and above a predetermined temperature on the solenoid or on the rotary solenoid and to interpose it in series with the solenoid or the rotary solenoid in the electric circuit.

What is claimed is:

1. An auxiliary lamp device equipped with a cover for a vehicle, comprising: an auxiliary lamp for a vehicle, said lamp including an enclosed casing and a lens attached to said casing, said auxiliary lamp attachable to a body portion of a vehicle; a cover rotatably mounted on said casing for rotation between a closed position where it covers said lens of said auxiliary lamp and an open position where it uncovers said lens of said auxiliary lamp; and a cover driving mechanism for rotating said cover from the closed position to the open position, including a solenoid in circuit with a switch; wherein the switch of said solenoid is for disposition inside the interior cabin of the vehicle.

2. The auxiliary lamp device for a vehicle defined in claim 1 wherein said cover driving mechanism includes a driving spring for urging said cover, when in the closed position, via a rotary shaft of said cover in the opening direction of said cover, a detent mechanism for checking the rotation of said cover against said driving spring, and said solenoid permitting the rotation of said cover by releasing the checked state of said detent mechanism.

3. The auxiliary lamp device for a vehicle as defined in claim 2 wherein said rotary shaft of said cover includes a disc fixed thereto inside said casing of said auxiliary lamp, said disc having a detent-receiving groove formed on the circumference thereof, a detent member engaging with the groove while said cover is at the closed position, and said solenoid having a plunger connected to said detent member and projected by the action of a return spring to place said detent member at the engaging position when said solenoid is not energized and movable to disengage said detent from the engaging position when said solenoid is energized.

4. The auxiliary lamp device for a vehicle as defined in claim 1, 2 or 3 wherein said switch of said solenoid serves also as a switch of the bulb of said auxiliary lamp.

5. The auxiliary lamp device for a vehicle as defined in claim 1 wherein an electric circuit for said auxiliary lamp comprises a series circuit of said solenoid, a normally-closed first thermostat switch, the bulb of said auxiliary lamp, and a power source, and a normally-open second thermostat switch connected in parallel across said first thermostat switch and said solenoid, and both of said first and second thermostat switches disposed on the wall of a reflector of said auxiliary lamp and have such characteristics that along with temperature rise, said second thermostat switch is first closed and then said first thermostat switch is opened.

6. The auxiliary lamp device for a vehicle as defined in claim 1 wherein said cover driving mechanism includes a rotary solenoid having a rotary shaft connected for rotation with said rotary shaft of said cover in such a manner that the displacement thereof in the axial direction is absorbed, and said cover is opened and closed when a current to said rotary solenoid is turned on and off, respectively.

7. The auxiliary lamp device for a vehicle as defined in claim 6 wherein a switch of said rotary solenoid serves also as a switch of the bulb of said auxiliary lamp.

* * * * *